May 26, 1931.  J. R. BUTLER  1,807,382
UNIVERSAL CONNECTION FOR PISTON RODS
Filed Jan. 15, 1929
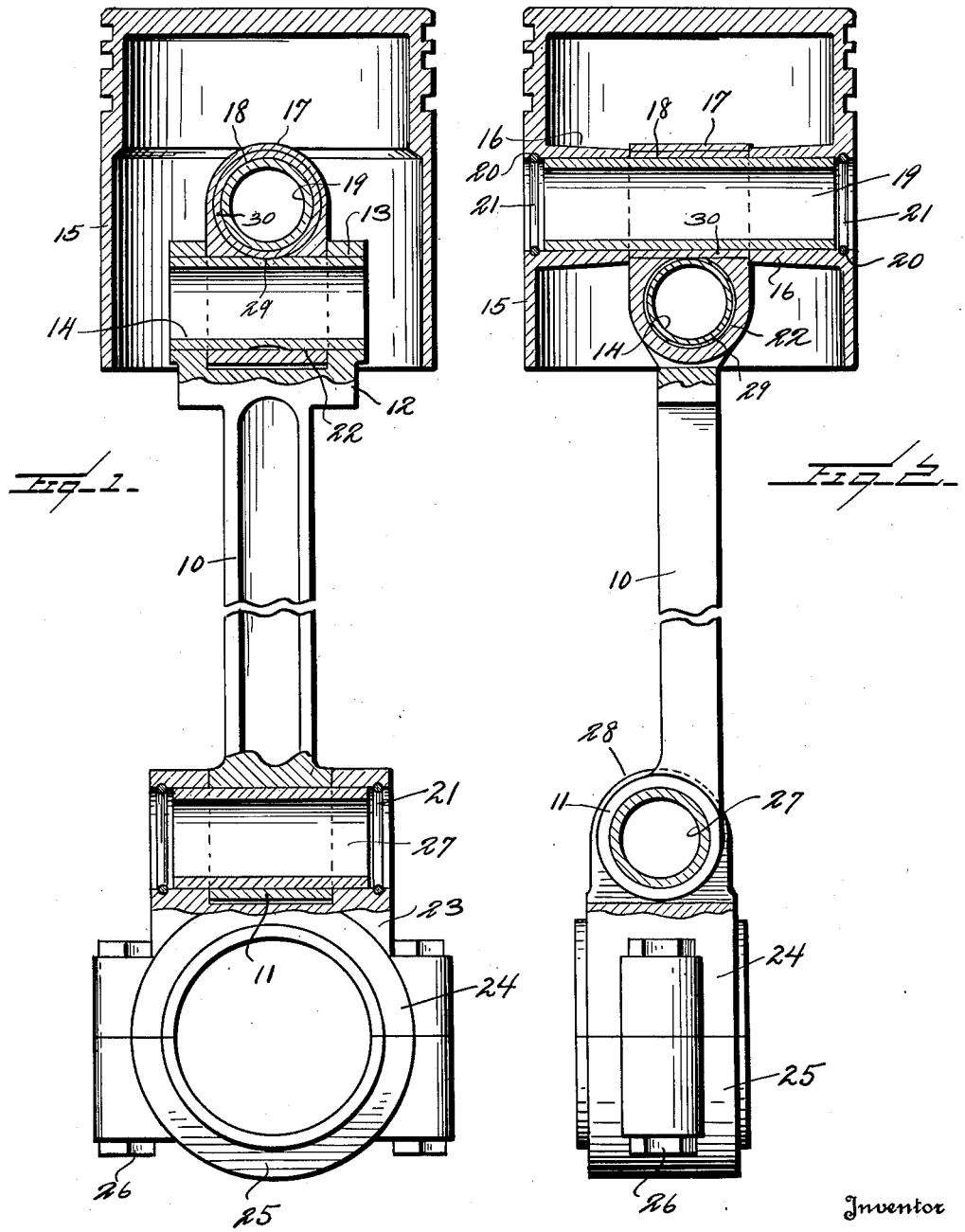
Inventor
J. R. Butler
By Watson E. Coleman
Attorney Patented May 26, 1931

1,807,382

UNITED STATES PATENT OFFICE

JOHN R. BUTLER, OF DURANGO, COLORADO, ASSIGNOR OF ONE-HALF TO JENNIE C. McLEAN, OF DURANGO, COLORADO

UNIVERSAL CONNECTION FOR PISTON RODS

Application filed January 15, 1929. Serial No. 332,583.

This invention relates to improvements in means for connecting piston rods to trunk pistons and particularly to the universal connection between the connecting rod and the piston.

The object of this invention is to provide a construction of this character which is extremely simple, which does away with the ordinary "universal cross" commonly used for this purpose, and in which the piston rod and the piston are connected to the knuckle by fully floating pins.

A further object is to provide means whereby the piston rod may be connected to the crank shaft by a floating pin connection.

A further object is to provide a device of this character which does away entirely with the use of cotter pins, bolts and nuts which are very likely to become loose and cause trouble, and another object is to so construct the device that the rod is self-aligning and to provide a construction which may be used on motors as built today.

My invention is illustrated in the accompanying drawings, wherein:—

Figure 1 is a sectional view of a piston rod constructed in accordance with my invention;

Figure 2 is a sectional view transverse to the section shown in Figure 1;

Figure 3 is an end view of the locking ring.

Referring to the drawings, 10 designates a piston rod which is shown as I-shaped in cross section. The lower end of this piston rod is laterally offset as at 11. The upper end of the piston rod is formed with the laterally offset ears 12 apertured as at 13 for the passage of a tubular pin 14. The piston 15 may be of any suitable character as for instance the ordinary trunk piston and has the usual inwardly extending bearings or bosses 16 spaced from each other at their inner ends. The piston is connected to the piston rod 10 by means of a block or knuckle 17 which is rectangular in cross section and formed with a transverse bore 18 at its inner end. This knuckle 17 is adapted to fit between the ends of the bosses 16 with the bore 18 in alinement with the bores of these bosses or bearings and thus it is adapted to receive the tubular pin 19. This pin has a length nearly equal to the diameter of the piston but not quite, so that when the pin is fully in place, it terminates short at each end of the outer surface of the piston. The bore of each bearing or boss 16 at its outer end is formed with an annular seat 20 to receive an expansible locking ring 21 so that when the pin 19 is forced fully home, it is held against longitudinal movement and against detachment from the piston by means of these locking rings 21.

The head or knuckle 17 is provided with a bore 22 which is at right angles to the bore 18 and which is of a diameter sufficient to receive the transversely extending pin 14 previously referred to. This pin is tubular and preferably will have a length less than the length of the bore 22 plus the depth of the ears 12. This pin may be held in place within the ears 12 by means to be later described.

The offset outer end of the piston rod 10 is provided with a transverse bore alining with an aperture formed in opposed ears 23 formed upon one section 24 of a split bearing, the other section of which is designated 25. The two sections of the split bearing are shown as being engaged with each other by means of the bolts 26. The tubular pin 27 connecting the piston rod to the split bearing has a length less than the distance between the outer faces of the ears 23 so as to receive the locking rings 21 which are disposed in seats in the same manner as are the locking rings 21.

As shown in Figure 1 the pin 14 is held in place by having formed at its middle a circumferential recess 29 which is laterally concave. Surrounding the pin 19 is a bushing 30 which fits within this recess as shown in Figure 1 and thus locks this pin 14 in place against any lateral movement.

It will be seen that there are no bolts or nuts used in the bearings of my trunnion block 17 nor in the bearing connecting the bearing rod to the crank shaft. Nuts and bolts work loose and come off. They are likely to project and strike parts of the crank case, cams, etc., and are a constant source of trouble. My connecting rods are self-alining and may be used with any ordinary trunk piston and do not require a special piston construction.

Thus my connecting rods with the trunnion block and like parts may be used for replacements. It will be seen that I secure a full floating pin connection between the connecting rod and the piston and between the connecting rod and the bearing for the crank shaft and positively lock the tubular bearing pin in place by a locking ring. My rod is very simple in design, cheap to build, light in construction, can be used in the present type of motor, has no bolts, nuts or cotter keys to get loose.

With my construction the piston will travel up and down the cylinder walls without being cramped on account of the piston pin hole being out of true because the connecting rod is bent or because the crank shaft floats forward and backward. This happens when the thrust bearing of the crank shaft gets worn and this is one of the things that causes the cylinders to wear unequally. This unequal wearing of the cylinders is completely eliminated by the use of my device. It may be used as a right or left connecting rod by driving out the lower pin and turning the rod half way round. It will also be seen that I do away entirely with the use of a "universal cross" as this is expensive, heavy and requires the use of bolts and nuts.

In my rod connection shown, I use the full floating pins instead of oscillating pins as commonly used. These full floating pins will wear three or more times longer than the usual type of pins or bolts.

I claim:—

1. A piston rod bifurcated at its upper end to provide two apertured ears, a trunnion block disposed and fitting between said ears and having a transverse passage in one end, the other end of the trunnion block being formed to fit between the inwardly extending bosses of a trunk piston and having a passage disposed at right angles to the first named passage, a pair of tubular pins extending through both of said passages one of said pins having an annular channel at a point spaced inwardly from the opposite ends thereof, the other pin being adapted to rotatably seat in said annular channel whereby to lock said first pin against longitudinal movement, and means engaging the walls of said passages for holding the pins in place.

2. The combination with a trunk piston having inwardly extending tubular bosses constituting bearings, of a piston rod coacting with the piston and having at one end a pair of spaced apertured ears, a trunnion block fitting and disposed between said ears and having an aperture in alinement with the apertures in said ears, the opposite end of the trunnion block having a passage at right angles to the first named passage and adapted to aline with and fit between the tubular bosses of the piston, a tubular pin disposed through the passages of the ears and the first named passage in the trunnion block, said tubular pin having an annular channel at a point spaced inwardly from the opposite ends thereof, and a tubular pin passing through the bosses of the pistons and the second named passage of the trunnion block, the pin being shorter than the diameter of the piston, the end being adapted to rotatably seat in the annular channel of said first pin whereby to lock said first pin against longitudinal movement, and expansible locking rings disposed within the outer ends of the piston bosses and seating therein and holding the tubular pin in place.

3. The combination with a trunk piston having inwardly extending tubular bosses constituting bearings, of a piston rod coacting with the piston and having at one end a pair of spaced apertured ears, a trunnion block fitting and disposed between said ears and having an aperture in alinement with the apertures in said ears, the opposite end of the trunnion block having a passage at right angles to the first named passage and adapted to aline with and fit between the tubular bosses of the piston, a tubular pin disposed through the passages of the ears and the first named passage in the trunnion block said tubular pin having an annular channel in the periphery thereof, a tubular pin passing through the bosses of the pistons and the second named passage of the trunnion block said second pin being adapted to engage said first pin in said annular channel whereby to hold said pin against longitudinal movement but permitting circumferential movement, the pin being shorter than the diameter of the piston, and expansible locking rings disposed within the outer ends of the piston bosses and seating therein and holding the tubular pin in place, the opposite end of the piston rod being formed with a transversely extending aperture, a bearing member having spaced ears between which the end of the connecting rod is received, and a tubular pin passing through said ears and connecting rod and shorter than the distance between the outer faces of said ears, and expansible locking rings disposed in the outer ends of the passages in said ears and holding the pin in place.

4. A piston rod bifurcated at its outer end to provide two apertured ears, a trunnion block fitting and disposed between said ears and having a transverse passage in one end, the other end of the trunnion block being formed to fit between the inwardly extending bosses of a trunk piston and having a passage disposed at right angles to the first named passage, tubular pins extending through both of said passages, means engaging the walls at the ends of the first named passage and holding the pin therein in place, the pin connecting the piston rod to said block being formed with a circumferentially extending channel and the pin connecting the piston to the block having a sleeve bushing intersecting said channel to thereby lock the channeled pin in place against longitudinal movement but permitting circumferential movement thereof.

In testimony whereof I hereunto affix my signature.

JOHN R. BUTLER.